United States Patent
Sah et al.

(10) Patent No.: US 9,430,713 B2
(45) Date of Patent: Aug. 30, 2016

(54) METHOD AND APPARATUS FOR DETECTING REPETITIVE PATTERN IN IMAGE

(71) Applicant: SAMSUNG SDS CO., LTD., Seoul (KR)

(72) Inventors: Sudhakar Sah, Seoul (KR); Sang Hak Lee, Seoul (KR); Jong Hang Kim, Seoul (KR); Seong Jong Ha, Seoul (KR); Yu Ri Ahn, Seoul (KR); Yeon Hee Kwon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/078,443

(22) Filed: Mar. 23, 2016

(65) Prior Publication Data

US 2016/0210527 A1     Jul. 21, 2016

Related U.S. Application Data

(62) Division of application No. 14/289,894, filed on May 29, 2014, now Pat. No. 9,330,450.

(30) Foreign Application Priority Data

May 31, 2013 (KR) ........................ 10-2013-0062249

(51) Int. Cl.
    *G06K 9/46* (2006.01)
    *G06T 7/00* (2006.01)
    (Continued)

(52) U.S. Cl.
    CPC ........... *G06K 9/4633* (2013.01); *G06K 9/4642* (2013.01); *G06K 9/6218* (2013.01);
    (Continued)

(58) Field of Classification Search
    None
    See application file for complete search history.

(56) References Cited

U.S. PATENT DOCUMENTS

| 4,791,586 A | 12/1988 | Maeda et al. |
|---|---|---|
| 8,929,452 B2 | 1/2015 | Nakashima |
| 2013/0176487 A1* | 7/2013 | Nakashima ........... G06T 3/4007 348/452 |

FOREIGN PATENT DOCUMENTS

| JP | 2010-151824 A | 7/2010 |
|---|---|---|
| JP | 2011-174896 A | 9/2011 |

(Continued)

OTHER PUBLICATIONS

Communication dated Oct. 21, 2015 issued by Korean Intellectual Property Office in counterpart Korean Patent Application No. 10-2013-0062249.

*Primary Examiner* — Andrew Moyer
(74) *Attorney, Agent, or Firm* — Sughrue Mion, PLLC (57) ABSTRACT

According to an aspect of the present invention, there is provided a method of detecting a repetitive pattern. The method includes: clustering a plurality of pixels that form an input image according to color and obtaining one or more color layers composed of pixels included in each cluster; selecting one or more effective layers from the color layers, wherein each of the effective layers includes a predetermined number or more of pixel components, each composed of a plurality of pixels and having a predetermined shape or a predetermined size of area; selecting a unit pattern repeatedly disposed at different locations in each effective layer from the pixel components included in each effective layer; calculating distances between the unit patterns in each effective layer; and calculating a repetition cycle of the unit pattern of the input image based on the calculated distances in each effective layer.

6 Claims, 8 Drawing Sheets

(51) Int. Cl.
    *G06T 7/40*        (2006.01)
    *G06K 9/62*        (2006.01)

(52) U.S. Cl.
    CPC ............ *G06T 7/004* (2013.01); *G06T 7/0085* (2013.01); *G06T 7/408* (2013.01); *G06T 2207/10024* (2013.01); *G06T 2207/20061* (2013.01); *G06T 2207/30121* (2013.01); *G06T 2207/30148* (2013.01)

(56) References Cited

FOREIGN PATENT DOCUMENTS

| | | |
|---|---|---|
| KR | 10-2012-009481 A | 9/2012 |
| KR | 10-2012-0105149 A | 9/2012 |

\* cited by examiner

$$\begin{pmatrix} 5 & 5 & 5 & 5 \\ 5 & 10 & 5 & 7 \\ 5 & 5 & 5 & 3 \\ 5 & 5 & 5 & 5 \end{pmatrix}$$

METHOD AND APPARATUS FOR DETECTING REPETITIVE PATTERN IN IMAGE

This is a divisional application of U.S. application Ser. No. 14/289,894 filed May 29, 2014, which claims priority from Korean Patent Application No. 10-2013-0062249 filed on May 31, 2013 in the Korean Intellectual Property Office, the disclosures of which are incorporated herein by reference in their entireties.

BACKGROUND OF THE INVENTION

1. Field of the Invention

The present invention relates to a method and apparatus for detecting a repetitive pattern in an image.

2. Description of the Related Art

To detect a defect in a semiconductor wafer or an organic light-emitting diode (OLED), light-emitting diode (LED) or liquid crystal display (LCD) substrate, a technique (such as automatic defect classification) of detecting a defect by sensing an appearance defect is being used. This visual detection technique can save production cost by detecting a defect relatively quickly and significantly reducing a defect rate.

The conventional visual detection technique detects a defect in a test image by comparing a reference image of a wafer or substrate without a defect with the test image. Therefore, the conventional visual detection technique essentially needs a reference image of a wafer or substrate without a defect.

However, in some cases, it may be difficult to provide a reference image. For example, it may be technically difficult to satisfy requirements for resolution and precision, or there may be constraints of production cost and time needed to form a reference image for each unit process.

In such cases, it is required to detect a defect in a test image without a reference image.

SUMMARY OF THE INVENTION

Aspects of the present invention provide a method and apparatus for effectively detecting a repetitive pattern in an input image in order to detect a defect by visual detection without a reference image.

Aspects of the present invention also provide a method of detecting a defect in a test image using a repetitive pattern detected in an input image in order to detect a defect by visual detection without a reference image.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a method of detecting a repetitive pattern. The method includes: clustering a plurality of pixels that form an input image according to color and obtaining one or more color layers composed of pixels included in each cluster; selecting one or more effective layers from the color layers, wherein each of the effective layers includes a predetermined number or more of pixel components, each composed of a plurality of pixels and having a predetermined shape or a predetermined size of area; selecting a unit pattern repeatedly disposed at different locations in each effective layer from the pixel components included in each effective layer; calculating distances between the unit patterns in each effective layer; and calculating a repetition cycle of the unit pattern of the input image based on the calculated distances in each effective layer.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Like reference numerals refer to like elements throughout the specification. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
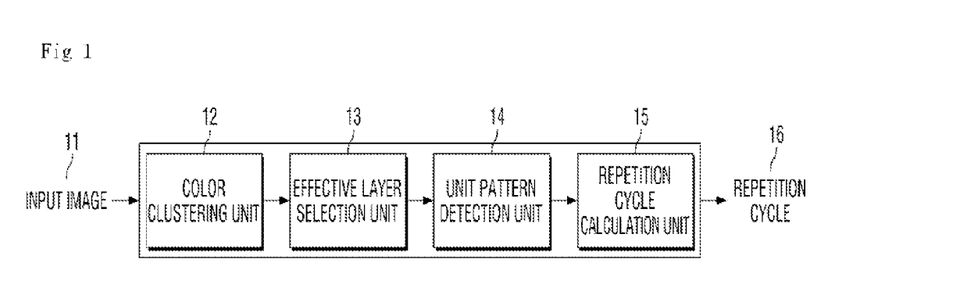
FIG. 1 is a block diagram of an apparatus for detecting a repetitive pattern according to an embodiment of the present invention.

FIG. 1 is a block diagram of an apparatus for detecting a repetitive pattern according to an embodiment of the present invention. Referring to FIG. 1, the repetitive pattern detection apparatus includes a color clustering unit 12 which obtains one or more color layers by performing clustering, an effective layer selection unit 13 which selects one or more effective layers from the color layers, a unit pattern detection unit 14 which selects a unit pattern in each effective layer, and a repetition cycle calculation unit 15 which calculates distances between the unit patterns in each effective layer and calculates a pattern repetition cycle based on the calculated distances in each effective layer. The repetitive pattern detection apparatus receives an input image 11 and calculates a repetition cycle 16 using the above components.

Figure 2:
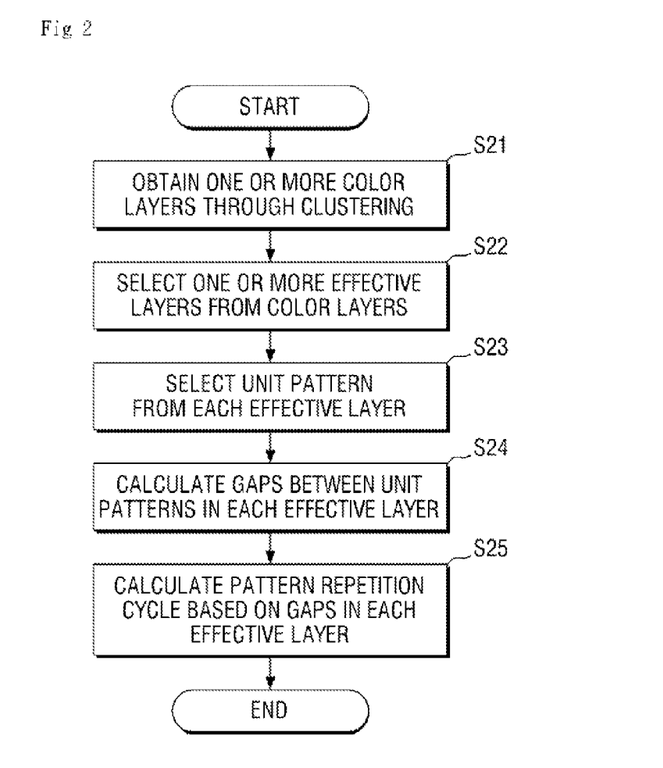
FIG. 2 is a flowchart illustrating a method of detecting a repetitive pattern according to another embodiment of the present invention.

FIG. 2 is a flowchart illustrating a method of detecting a repetitive pattern according to another embodiment of the present invention.

Referring to FIG. 2, the color clustering unit 12 clusters a plurality of pixels, which form an input image, according to color and obtains one or more color layers composed of pixels included in each cluster (operation S21).

Figure 3:
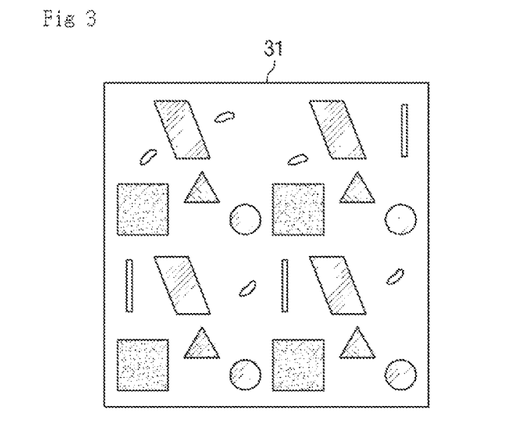
FIG. 3 illustrates an input image according to another embodiment of the present invention.
Figure 4:
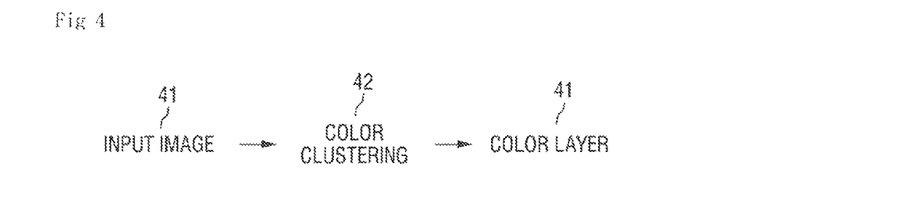
FIG. 4 is a flowchart illustrating color clustering according to another embodiment of the present invention.

Specifically, FIG. 3 illustrates an input image 31 according to another embodiment of the present invention. FIG. 4 is a flowchart illustrating the clustering of the pixels according to color (i.e., color clustering) (operation S21) according to another embodiment of the present invention. Referring to FIG. 3, the input image 31 may include various colors of shapes composed of a plurality of pixels. Some of these shapes may be arranged at regular intervals to form a pattern, and the other shapes may be distributed irregularly. Referring to FIG. 4, the color clustering unit 12 clusters a plurality of pixels, which form an input image 41, according to color in order to obtain an image composed only of pixels of a similar color. Here, since information about color distribution of the input image 41 is generally not provided in advance, mean shift clustering may be used. In mean shift clustering, a representative value for color information values (e.g., RGB values) of pixels is selected, and a cluster is formed using the representative value. Accordingly, one or more color layers 43 composed of pixels included in each cluster are obtained.

Figure 5:
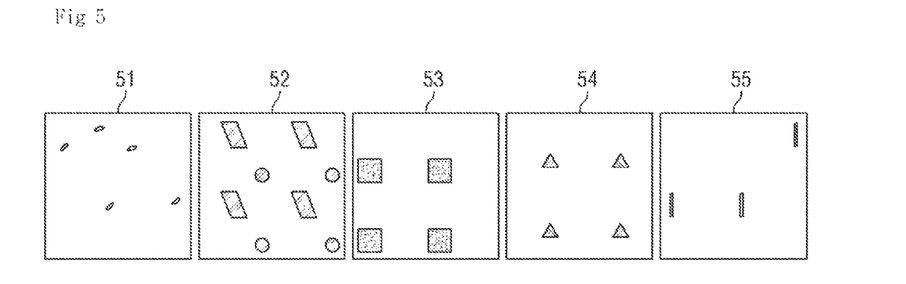
FIG. 5 illustrates the result of color clustering according to another embodiment of the present invention.

FIG. 5 illustrates the result of color clustering according to another embodiment of the present invention. That is, the color clustering of an input image according to an embodiment of the present invention may produce a first color layer 51, a second color layer 52, a third color layer 53, a fourth color layer 54, and a fifth color layer 55.

Referring back to FIG. 2, the effective layer selection unit 13 selects one or more effective layers from the color layers (operation S22). Each of the effective layers includes a predetermined number or more of pixel components, each composed of a plurality of pixels and having a predetermined shape or a predetermined size of area. Only necessary color layers (excluding unnecessary color layers) for detecting a repetitive pattern are selected from the color layers obtained in operation S21.

Figure 6:
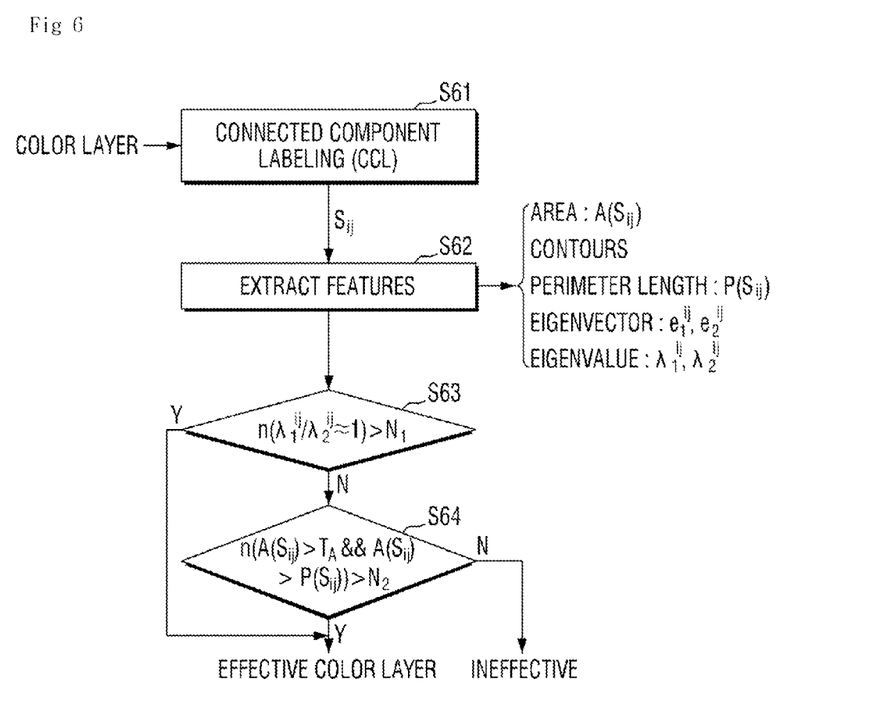
FIG. 6 is a flowchart illustrating a process of selecting one or more effective layers according to another embodiment of the present invention.

FIG. 6 is a flowchart illustrating the selecting of the effective layers (operation S22) according to another embodiment of the present invention. The selecting of the effective layers (operation S22) according to the current embodiment may include the following operations. First, connected component labeling (CCL) is performed on each of the color layers obtained in operation S21 to obtain pixel components $S_{ij}$ (operation S61). Specifically, if n (n is an integer of 1 or more) color layers are obtained in operation S21 according to an embodiment of the present invention, an $i^{th}$ (i is an integer of 1 to n) color layer may include m (m is an integer of one or more) types of pixel components. For example, the second color layer 52 illustrated in FIG. 5 includes two types of pixel components, that is, parallelogram pixel components and circular pixel components. Ultimately, each of the pixel components $S_{ij}$ is a $j^{th}$ (j is an integer of 1 to m) pixel component included in the $i^{th}$ color layer. Next, features of the obtained pixel components $S_{ij}$ are extracted (operation S62). Specifically, at least one of an area $A(S_{ij})$, contours, a perimeter length $P(S_{ij})$, a pair of eigenvalues $\lambda_1^{ij}$ and $\lambda_2^{ij}$, and a pair of eigenvectors $e_1^{ij}$ and $e_2^{ij}$ of each of the pixel components $S_{ij}$ is obtained (operation S62). Here, the pair of eigenvalues $\lambda_1^{ij}$ and $\lambda_2^{ij}$ and the pair of eigenvectors $e_1^{ij}$ and $e_2^{ij}$ may be obtained through, e.g., principal component analysis.

After the features of the pixel components $S_{ij}$ are extracted, a pixel component having a predetermined shape or a predetermined size of area is selected as an effective pixel component $S_{ij}^a$. The predetermined shape may be, but is not limited to, a circle, a square, or a triangle. In an embodiment for selecting a circular pixel component, a pixel component whose ratio of the pair of eigenvalues $\lambda_1^{ij}$ and $\lambda_2^{ij}$ satisfies the following condition (that is, has a value close to one) may be selected as an effective pixel component (operation S63):

$$\lambda_1^{ij}/\lambda_2^{ij} \approx 1.$$

In another embodiment of the present invention, a pixel component whose ratio of the pair of eigenvalues $\lambda_1^{ij}$ and $\lambda_2^{ij}$ is in a range of 0.5 to 1 may be selected as an effective pixel component. In another embodiment of the present invention, a pixel component whose ratio of the pair of eigenvalues $\lambda_1^{ij}$ and $\lambda_2^{ij}$ is in a range of 0.7 to 1, 0.8 to 1, or 0.9 to 1 may be selected as an effective pixel component.

In an embodiment for selecting a pixel component having a predetermined size of area, a pixel component whose area $A(S_{ij})$ satisfies the following condition may be selected as an effective pixel component (operation S64):

$$A(S_{ij}) > T_A \&\& A(S_{ij}) > \alpha P(S_{ij}),$$

where TA is a value that can be determined in a specific process (e.g., a value equal to or less than 1% of the size of an input image), and $\alpha P(S_{ij})$ is a predetermined rate of the perimeter length $P(S_{ij})$ of a pixel component $S_{ij}$ (e.g., $\alpha$ may have a value of one or more).

Figure 7:
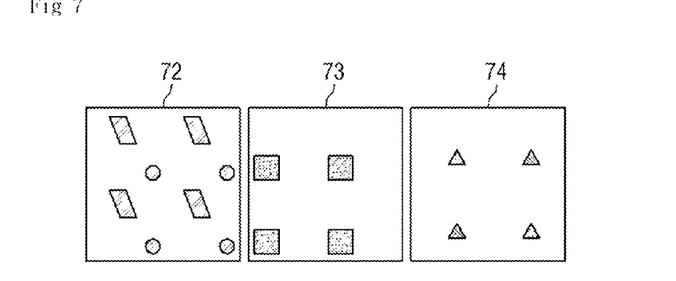
FIG. 7 illustrates effective layers selected according to another embodiment of the present invention.

As described above, a color layer including a predetermined number or more of such effective pixel components is selected as an effective layer. For example, a color layer including two or more effective pixel components may be selected as an effective layer. FIG. 7 illustrates effective layers selected according to another embodiment of the present invention. That is, a first effective layer 72, a second effective layer 73, and a third effective layer 74 may be selected according to the current embodiment of the present invention.

Referring back to FIG. 2, the unit pattern detection unit 14 selects a unit pattern repeatedly disposed at different locations in each effective layer from pixel components (i.e., effective pixel components $S_{ij}^a$) included in each effective layer (operation S23). The unit pattern may be selected based on a cost function value used to evaluate the feature similarity between the pixel components $S_{ij}^a$. Here, the feature similarity may refer to similarity in at least one of the features (e.g., the area $A(S_{ij})$, contours, perimeter length $P(S_{ij})$, eigenvalues $\lambda_1^{ij}$ and $\lambda_2^{ij}$, and eigenvectors $e_1^{ij}$ and $e_2^{ij}$ of each pixel component $S_{ij}^a$) extracted in operation S62. Specifically, similarity may be evaluated based on a cost function value calculated by comparing two arbitrary pixel components $S_{ij}^a$. For example, a unit pattern may be selected based on a cost function value calculated by comparing and matching overlapping regions of two arbitrary pixel components $S_{ij}^a$. The unit pattern may also be selected based on a cost function value calculated by comparing and matching contours of two arbitrary pixel components $S_{ij}^a$.

Figure 8:
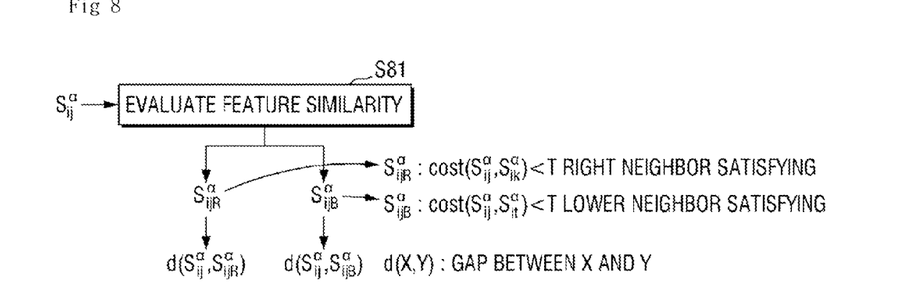
FIG. 8 is a flowchart illustrating a process of selecting a unit pattern according to another embodiment of the present invention.

FIG. 8 is a flowchart illustrating the selecting of the unit pattern (operation S23) according to another embodiment of the present invention. Referring to FIG. 8, the feature similarity between each pixel component $S_{ij}^a$ and another pixel component $S_{ij}^a$ is evaluated as described above (operation S81). When a cost function value calculated by comparing and matching features of two arbitrary pixel components is equal to or less than a predetermined threshold value T, the two pixel components may be treated as unit patterns that form a repetitive pattern of an input image. Accordingly, a pixel component $S_{ijR}^a$ (hereinafter, referred to as a 'right neighbor') which is closest to the right of each pixel component $S_{ij}^a$ and whose cost function value is equal to or less than the predetermined threshold value T may be selected, and a pixel component $S_{ijB}^a$ (hereinafter, referred to as a 'lower neighbor') which is the closest pixel component under each pixel component $S_{ij}^a$ and whose cost function value is equal to or less than the predetermined threshold value T may be selected. The selected pixel components $S_{ij}^a$ are unit patterns of a pattern detected in an input image.

Figure 9:
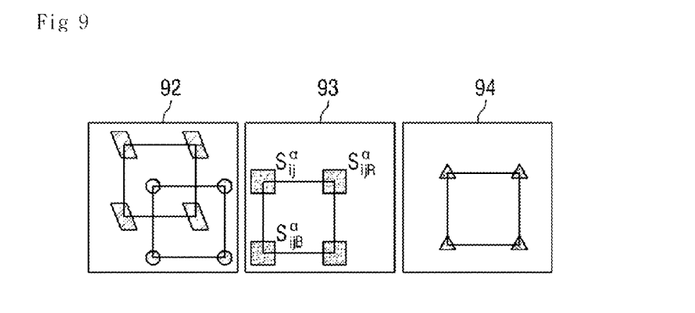
FIG. 9 illustrates unit patterns according to another embodiment of the present invention.

Referring back to FIG. 2, the repetition cycle calculation unit 15 calculates distances between unit patterns in each effective layer (operation S24) and calculates a repetition cycle of the unit pattern in the input image based on the calculated distances in each effective layer (operation S25). Specifically, a distance between each pixel component $S_{ij}^a$ and the right neighbor $S_{ijR}^a$ and a distance between each pixel component $S_{ij}^a$ and the lower neighbor $S_{ijB}^a$ may be calculated in operation S24. FIG. 9 illustrates unit patterns according to another embodiment of the present invention. Referring to FIG. 9, a layer 93 includes a square pixel component $S_{ij}^a$ connected to each of a right neighbor $S_{ijR}^a$ and a lower neighbor $S_{ijB}^a$ by a straight line. That is, in the layer 93, the square pixel component $S_{ij}^a$ is a unit pattern, and a length of the straight line is a distance between unit patterns. In most cases, the distance is a repetition cycle of the unit pattern. However, in some cases where, e.g., some pixel components are missing, some of distance values between unit patterns may be different from the repetition cycle of the unit pattern.

Figure 10:
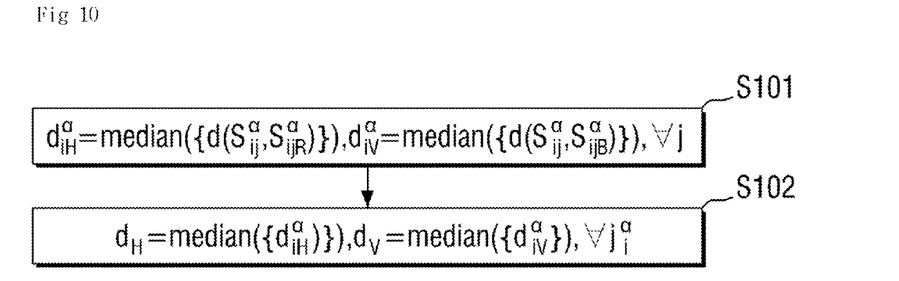
FIG. 10 is a flowchart illustrating part of a process of calculating a repetition cycle of a unit pattern according to another embodiment of the present invention.

Therefore, in an embodiment of the present invention, a median value of distance values between unit patterns is used to calculate a correct repetition cycle of the unit pattern. FIG. 10 is a flowchart illustrating part of the calculating of the repetition cycle of the unit pattern (operation S25) according to another embodiment of the present invention. Referring to FIG. 10, the calculating of the repetition cycle of the unit pattern (operation S25) includes calculating a first median value $(d_{iH}^a, d_{iV}^a)$ of all distances between unit patterns detected in a first layer (operations S101 and S102). Operation S25 further includes calculating a second median value of all distances between unit patterns detected in a second layer and determining a third median value of the first median value and the second median value to be a repetition cycle.

Figure 11:
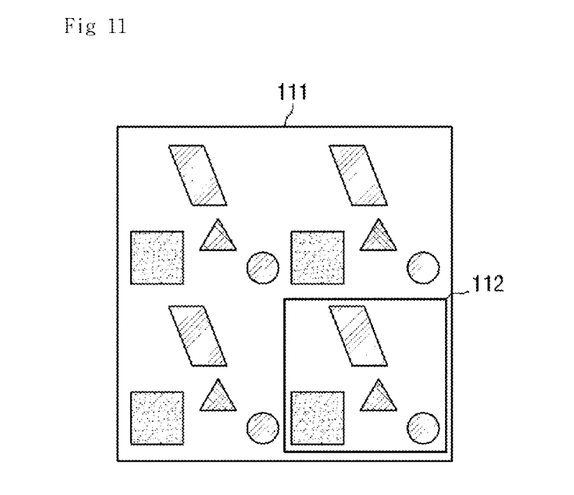
FIG. 11 illustrates a pattern image formed according another embodiment of the present invention.

FIG. 11 illustrates a pattern image 111 formed according to another embodiment of the present invention. The pattern image 111 illustrated in FIG. 11 has been formed using a pattern and a repetition cycle of the unit pattern obtained using the above-described method. In particular, a pattern such as a region 112 is repeated twice in horizontal and vertical directions.

Figure 12:
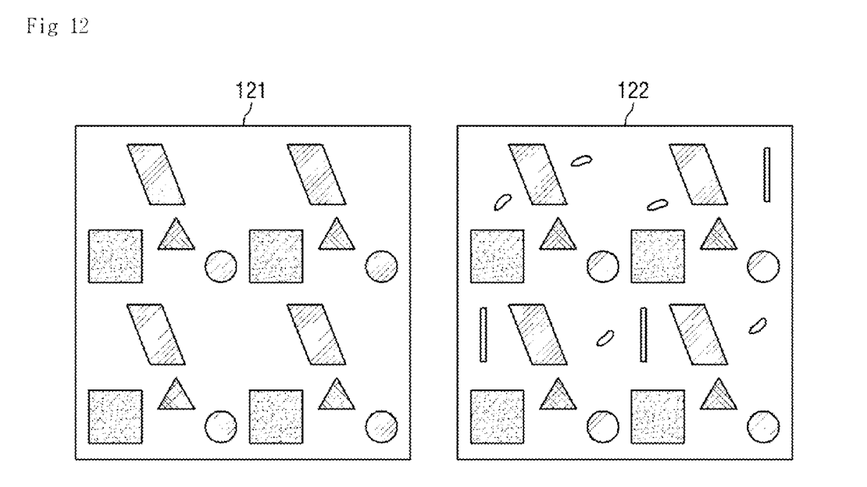
FIG. 12 illustrates a process of detecting a defect by comparing a pattern image and a test image according another embodiment of the present invention.

FIG. 12 illustrates a process of detecting a defect by comparing a pattern image 121 and a test image 122 according to another embodiment of the present invention. Referring to FIG. 12, the pattern image 121 constructed using the above-described method is compared with the test image 122 to detect any possible defect in the test image 122.

According to the above embodiment of the present invention, a defect in a test image can be detected by visual detection without a reference image by detecting a repetitive pattern in an input image. In addition, a defect in a test image can be detected using a given input image without the need to create a reference image suitable for each unit process. Therefore, various defects generated in various processes can be flexibly dealt with. Furthermore, even when some processes are changed or when a different type of substrate is used, defects can be detected flexibly and rapidly.

Until now, an embodiment of a method and apparatus for detecting a repetitive pattern in a case where a unit pattern has an arbitrary shape has been described. An embodiment of a method and apparatus for detecting a repetitive pattern in a case where a unit pattern is circular will now be described.

Figure 13:
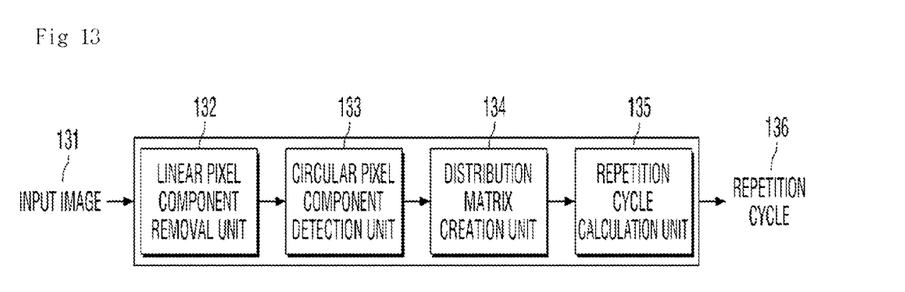
FIG. 13 is a block diagram of an apparatus for detecting a repetitive pattern according to another embodiment of the present invention.

FIG. 13 is a block diagram of an apparatus for detecting a repetitive pattern according to another embodiment of the present invention. Referring to FIG. 13, the repetitive pattern detection apparatus includes a linear pixel component removal unit 132 which removes linear pixel components by performing edge detection, a circular pixel component detection unit 133 which detects circular pixel components, a distribution matrix creation unit 134 which creates a distribution matrix by setting a grid and placing the circular pixel components in the grid, and a repetition cycle calculation unit 135 which calculates distances between the circular pixel components and a pattern repetition cycle. The repetitive pattern detection apparatus receives an input image 131 and calculates a repetition cycle 136 using the above components.

Figure 14:
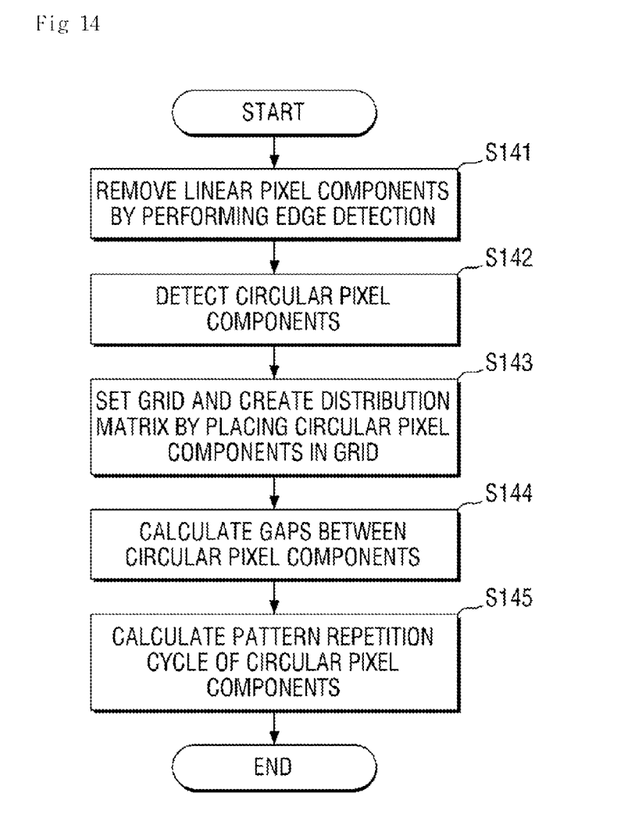
FIG. 14 is a flowchart illustrating a method of detecting a repetitive pattern according to another embodiment of the present invention.

FIG. 14 is a flowchart illustrating a method of detecting a repetitive pattern according to another embodiment of the present invention.

Referring to FIG. 14, to detect circular unit patterns in an input image, the linear pixel component removal unit 13 removes linear pixel components, which are lines formed by a plurality of pixels, from the input image by performing edge detection on pixels that form the input image (operation S141). Edge detection of the input image makes it easy to detect linear or circular pixel components in the input image. For edge detection of the input image, a Gaussian blurring filter or a canny edge detector may be used. After the edge detection, linear pixel components are removed from the input image.

Next, circular pixel components, which are circles formed by a plurality of pixels, are detected in the input image without the linear pixel components (operation S142). In operation S142, a Hough transform may be performed on the input image without the linear pixel components so as to detect the circular pixel components.

However, since the Hough transform may generate noise, a circular pixel component can be wrongly detected. To prevent this problem, a cross correlation matrix used to evaluate the correlation between each circular pixel component and another circular pixel component may be created to detect circular pixel components. The cross correlation matrix includes a similarity value between each circular pixel component and another circular pixel component as its element. As the similarity value between each circular pixel component and another circular pixel component increases, the element of the cross correlation matrix may have a greater value. Conversely, as the similarity value between each circular pixel component and another circular pixel component decreases, the element of the cross correlation matrix may have a smaller value. Therefore, a circular pixel component corresponding to an element having a predetermined value or less may be determined to have been wrongly detected and thus removed from pixel components from which a repetitive pattern is to be detected.

Figure 15:
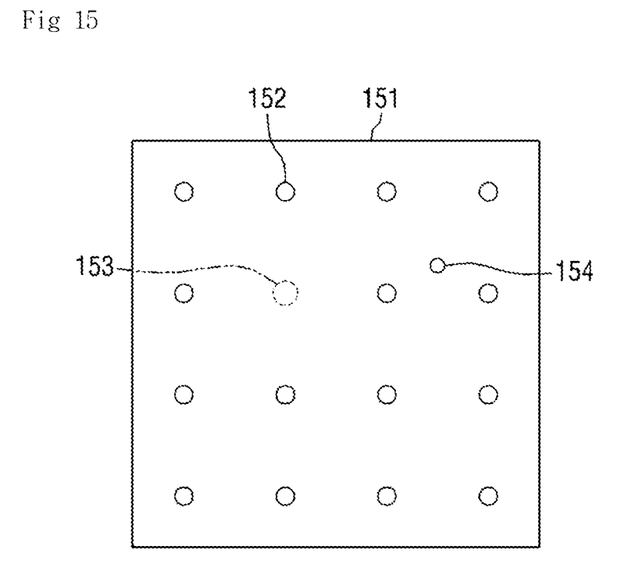
FIG. 15 illustrates an input image according to another embodiment of the present invention.

FIG. 15 illustrates an input image 151 according to another embodiment of the present invention. The input image 151 includes circular pixel components 152 and a pixel component 154 wrongly detected as a circular pixel component. A non-existent region 153 is a region in which a circular pixel component is likely to exist in view of the regularity of a pattern but does not actually exist.

Figure 16:
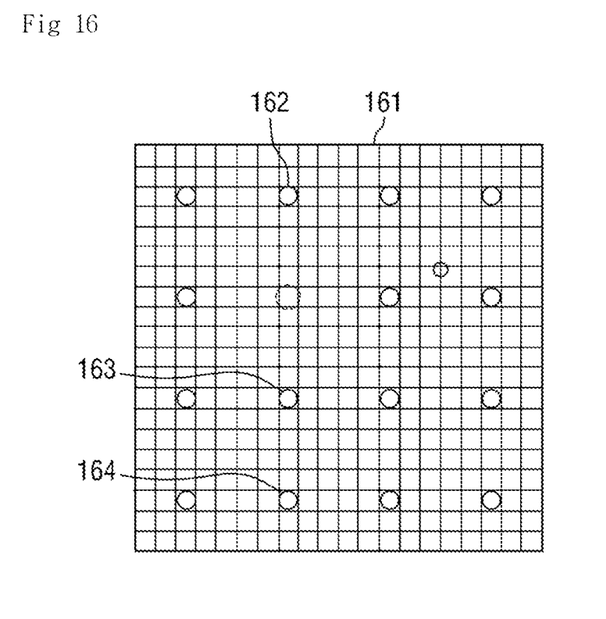
FIG. 16 illustrates a distribution matrix according to another embodiment of the present invention.

Referring back to FIG. 14, a grid of square cells that form a plurality of rows and a plurality of columns is set in an image, and a distribution matrix is formed by placing circular pixel components in the cells of the grid (operation S143). Specifically, a grid of a plurality of square cells that form a plurality of rows and a plurality of columns is set in an input image 161. Then, a distribution matrix is formed by placing circular pixel components in the cells of the grid. FIG. 16 illustrates a distribution matrix according to another embodiment of the present invention. In FIG. 16, a grid of 400 square cells that form 20 rows and 20 columns is set, and circular pixel components 162 through 164 are distributed in one column of the grid.

In a case where a distribution matrix is formed by placing circular pixel components in a grid set in an input image, circular pixel components may not be placed at all in some columns of the grid. Since the columns without circular pixel components include empty grid cells only, they may be removed in order to prevent unnecessary calculation in a repetitive pattern detection process. By removing columns unnecessary for the repetitive pattern detection process from the distribution matrix, a compact distribution matrix can be created.

Referring back to FIG. 14, distances between the circular pixel components are measured (operation S144), and a repetition cycle of the circular pixel components in the input image is calculated (operation S145). First, distances between circular pixel components in one of the columns are measured, and a frequency matrix having values of the distances as its elements is created. In an embodiment of the present invention, a distance between circular pixel components may be measured as the number of square cells between the circular pixel components.

Figure 17:
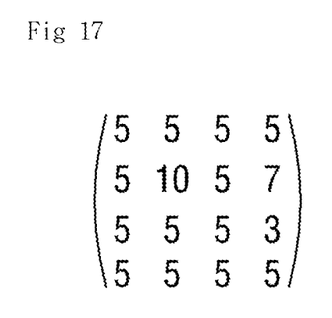
FIG. 17 illustrates a frequency matrix according to another embodiment of the present invention.

Next, a histogram of the elements of the frequency matrix is analyzed, and an element value having a greatest frequency is determined to be a repetition cycle. For example, FIG. 17 illustrates a frequency matrix according to another embodiment of the present invention. In a second column of the frequency matrix, an element having a value of 5 and an element having a value of 10 are arranged. Referring to FIG. 16, a distance between the circular pixel components 163 and 164 is 5, and a distance between the circular pixel components 162 and 163 is 10.

That is, the distance between the circular pixel components 162 and 163 is measured to be 10 due to a region in which a circular pixel component is likely to exist in view of the regularity of a pattern but does not actually exist. This value (i.e., 10) cannot be a correct repetition cycle value of the circular pixel component. If a histogram of the frequency matrix of FIG. 17 is analyzed to calculate the correct repetition cycle, it can be seen that the number of elements having a value of 5 is far greater than the number of elements having values of 3, 7 or 10. Therefore, it can be concluded that the pattern includes circular pixel components distributed in horizontal and vertical directions at regular intervals of five.

As described above with reference to FIG. 12, a pattern image constructed using a repetition cycle obtained by the above-described method is compared with a test image to detect any defect in the test image.

Methods and apparatuses for detecting a repetitive pattern according to various embodiments of the present invention are applicable to the semiconductor field. For example, the methods and apparatuses for detecting a repetitive pattern according to the embodiments of the present invention can be used to detect defects in a wafer including a plurality of semiconductor elements or in an organic light-emitting diode (OLED), light-emitting diode (LED) or liquid crystal display (LCD) (e.g., a TFT-LCD) related display or can be used to detect defects (e.g., a short circuit of a semiconductor element) in the semiconductor packaging related field such as ball grid array (BGA). Specifically, a repetitive pattern may be extracted from the regular arrangement of OLED or LED elements or LCD pixels that form a display, and then a defect in an OLED, LED or LCD (e.g., TFT-LCD) substrate may be detected without a reference image. In addition, a repetitive pattern may be extracted from the arrangement of balls that form a grid array, and then a defect in the BGA may be detected without a reference image. Further, a defect in a wafer including a plurality of semiconductor chips may be detected without a reference image by detecting a repetitive pattern according to various embodiments of the present invention.

In particular, in a semiconductor process using a highly integrated pattern of semiconductor elements, a defect in a test image can be detected by visual detection without a reference image by detecting a repetitive pattern in an input image. In addition, a defect in a test image can be detected using a given input image without the need to create a reference image suitable for each unit process of the semiconductor field. Therefore, various defects generated in various processes of the semiconductor field can be flexibly dealt with. Furthermore, even when some processes are changed or when a different substrate is used, defects can be detected flexibly and rapidly.

According to the present invention, a defect in a test image can be detected by visual detection without a reference image by detecting a repetitive pattern in an input image. Therefore, even when it is difficult to provide a reference image, a visual detection technique that can save production cost by detecting a defect relatively quickly and significantly reducing a defect rate can still be used as it is.

In addition, according to the present invention, a defect in a test image can be detected using a given input image without the need to create a reference image suitable for each unit process. Therefore, various defects generated in various processes can be flexibly dealt with. Furthermore, even when some processes are changed or when a different type of substrate is used, defects can be detected flexibly and rapidly.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method of detecting a repetitive pattern, the method comprising:
    performing edge detection on pixels that form an input image to identify linear pixel components, wherein the linear pixel components are lines formed by the pixels;
    removing the linear pixel components from the input image to provide a modified input image;
    detecting circular pixel components in the modified input image, wherein the circular pixel components are circles formed by a plurality of the pixels;
    setting a grid of a plurality of square cells in the input image, wherein the square cells of the grid form a plurality of rows and a plurality of columns;
    creating a distribution matrix by placing the circular pixel components in the cells of the grid; and
    calculating a repetition cycle of the circular pixel components by measuring distances between the circular pixel components;
    wherein at least one of the performing, removing, detecting, setting, creating, and calculating is performed using a hardware processor.

2. The method of claim 1, wherein the calculating of the repetition cycle comprises:
    creating a frequency matrix having, as columnar elements, the distances between the circular pixel components;
    analyzing a histogram of the elements of the frequency matrix; and
    determining an element value with a greatest frequency as the repetition cycle.

3. The method of claim 1, wherein the detecting of the circular pixel components comprises creating a cross correlation matrix for evaluating a correlation between each of the circular pixel components and another one of the circular pixel components.

4. The method of claim 1, wherein the detecting of the circular pixel components comprises performing a Hough transform on the modified input image.

5. The method of claim 1, wherein the creating of the distribution matrix further comprises removing columns of the grid in which no circular pixel components are placed.

6. An apparatus for detecting a repetitive pattern, the apparatus comprising:
    a linear pixel component removal unit configured to identify and remove linear pixel components from an input image, wherein: the linear pixel component identifies the linear pixel components by performing edge detection on pixels that form the input image, the linear pixel components are lines formed by the pixels, and a modified input image is provided by removing the linear pixel components;
    a circular pixel component detection unit configured to detect circular pixel components in the modified input image, wherein the circular pixel components are circles formed by a plurality of the pixels;
    a distribution matrix creation unit configured to set a grid of a plurality of square cells in the input image, wherein the square cells of the grid form a plurality of rows and a plurality of columns, and to create a distribution matrix by placing the circular pixel components in the cells of the grid; and
    a repetition cycle calculation unit calculating a repetition cycle of the circular pixel components by measuring distances between the circular pixel components;
    wherein the linear pixel component removal unit, the circular pixel component detection unit, the distribution matrix creation unit, and the repetition cycle calculation unit are implemented using at least one hardware processor.

* * * * *